(12) United States Patent
Coglitore et al.

(10) Patent No.: US 10,395,688 B2
(45) Date of Patent: Aug. 27, 2019

(54) STORAGE LIBRARY SYSTEM

(71) Applicant: Sony Corporation, Tokyo (JP)

(72) Inventors: Giovanni Coglitore, Saratoga, CA (US); Ando Hideki, Tokyo (JP); Horst Schellong, Cupertino, CA (US)

(73) Assignee: SONY CORPORATION OF AMERICA, New York, NY (US)

( * ) Notice: Subject to any disclaimer, the term of this patent is extended or adjusted under 35 U.S.C. 154(b) by 77 days.

(21) Appl. No.: 15/217,866

(22) Filed: Jul. 22, 2016

(65) Prior Publication Data

US 2017/0255533 A1 Sep. 7, 2017

Related U.S. Application Data

(60) Provisional application No. 62/303,683, filed on Mar. 4, 2016.

(51) Int. Cl.
*G06F 11/14* (2006.01)
*G11B 17/22* (2006.01)
*G11B 17/04* (2006.01)

(52) U.S. Cl.
CPC .............. *G11B 17/22* (2013.01); *G11B 17/04* (2013.01); *G06F 11/14* (2013.01); *Y10S 901/14* (2013.01)

(58) Field of Classification Search
CPC ............. G06F 11/0784; G06F 11/1076; G06F 11/1092; G06F 11/1443; G06F 11/1446; G06F 11/1458; G06F 11/1461; G06F 11/20; G06F 11/2007; G06F 11/2094
See application file for complete search history.

(56) References Cited

U.S. PATENT DOCUMENTS

| | | | |
|---|---|---|---|
| 5,497,457 A | 3/1996 | Ford | |
| 5,864,655 A * | 1/1999 | Dewey | G06F 11/1076 714/42 |
| 5,970,030 A | 10/1999 | Dimitri | |
| 6,237,109 B1 * | 5/2001 | Achiwa | G11B 27/002 714/6.12 |
| 6,360,232 B1 * | 3/2002 | Brewer | G06F 11/1469 360/51 |
| 7,818,518 B2 * | 10/2010 | Gladwin | G06F 11/1076 711/154 |
| 7,877,362 B2 * | 1/2011 | Gokhale | G06Q 10/087 707/661 |
| 8,346,733 B2 * | 1/2013 | Gokhale | G06F 3/0604 707/674 |
| 8,407,382 B2 * | 3/2013 | Bondurant | G06F 3/0608 710/62 |
| 8,713,405 B2 | 4/2014 | Healey, Jr. et al. | |

(Continued)

*Primary Examiner* — Nadeem Iqbal
(74) *Attorney, Agent, or Firm* — Trellis IP Law Group, PC (57) ABSTRACT

Implementations generally relate to storage systems. In one implementation, a system includes a plurality of storage libraries that store a plurality of removable media units. The system also includes a plurality of head units for reading and writing to one or more of the removable media units. The system also includes a plurality of robots that transfer one or more of the removable media units between one or more of the storage libraries and one or more of the head units. The system also includes enabling one or more of the robots to recover a set of data from two or more of the removable media units if a failure occurs in association with at least one of the other removable media units.

17 Claims, 5 Drawing Sheets

(56) References Cited

U.S. PATENT DOCUMENTS

| | | |
|---|---|---|
| 8,918,478 B2 | 12/2014 | Ozzie et al. |
| 2001/0047462 A1* | 11/2001 | Dimitroff ................ G06F 3/061 |
| | | 711/162 |
| 2002/0087785 A1* | 7/2002 | Milligan ............. G06F 11/1076 |
| | | 711/112 |
| 2003/0182593 A1* | 9/2003 | Emberty ................... H04L 1/22 |
| | | 714/5.11 |
| 2010/0020418 A1 | 1/2010 | Onoda |
| 2014/0052662 A1 | 2/2014 | Nesnow |
| 2014/0286737 A1 | 9/2014 | Yang et al. |
| 2015/0236725 A1 | 8/2015 | Reinart |

* cited by examiner

FIG. 6

STORAGE LIBRARY SYSTEM

CROSS REFERENCES TO RELATED APPLICATIONS

This application claims priority from U.S. Provisional Patent Application Ser. No. 62/303,683, entitled STORAGE LIBRARY SYSTEM, filed on Mar. 4, 2016, which is hereby incorporated by reference as if set forth in full in this application for all purposes.

BACKGROUND

Data storage devices store information. Data storage devices may include, for example, hard disks, optical discs, and magnetic tape. These types of storage devices typically function as secondary storage or long-term persistent storage, and are also referred to as non-volatile memory in that they continue to store information even after having been power cycled. Data storage devices are subject to failure in that a sector of a given data storage device may fail. Consequently, information stored in a failed sector is lost. A common means for recovering data is to store the same information on two different data storage devices. As such, information lost on one data storage device may be recovered from the other data storage device.

SUMMARY

Implementations generally relate to storage systems. In some implementations, a system includes a plurality of storage libraries that store a plurality of removable media units. The system also includes a plurality of head units for reading and writing to one or more of the removable media units. The system also includes a plurality of robots that transfer one or more of the removable media units between one or more of the storage libraries and one or more of the head units. The system also includes enabling one or more of the robots to recover a set of data from two or more of the removable media units if a failure occurs in association with at least one of the other removable media units.

With further regard to the system, in some implementations, the plurality of storage libraries, the plurality of removable media units, the plurality of head units, and the plurality of robots are disaggregated. In some implementations, one or more of the storage libraries are located in different buildings from one or more of the head units.

With further regard to the system, in some implementations, if the failure occurs at at least one failed removable media unit of the plurality of removable media units, the system enables at least one of the robots to bypass the at least one failed removable media unit and to recover the set of data from two or more other removable media units. In some implementations, if the failure occurs at at least one failed robot associated with a particular storage library, the system enables at least one other robot to bypass the at least one failed robot in order to access one or more of the removable media units stored at the particular storage library. In some implementations, if the failure occurs at at least one failed robot associated with a particular head unit, the system enables at least one other robot to bypass the at least one failed robot in order to transfer one or more of the removable media units to and from the particular head unit. In some implementations, if the failure occurs at at least one failed storage library, the system enables at least one of the robots to bypass the at least one failed storage library in order to access one or more of the removable media units stored at another storage library. In some implementations, if the failure occurs at at least one failed head unit, the system enables at least one of the robots to bypass the at least one failed head unit in order to transfer one or more of the removable media units to and from another head unit.

With further regard to the system, in some implementations, each removable media unit is optical disc. In some implementations, the removable media units are disaggregated. In some implementations, one or more of the removable media units are stored in one or more storage trays. In some implementations, the one or more robots transfer the one or more removable media units in a storage tray from at least one of the storage libraries to the one or more head units. In some implementations, each head unit includes one or more drives for reading one of the removable media units. In some implementations, each head unit includes one or more burners for writing to one of the removable media units.

With further regard to the system, in some implementations, the system performs operations including separating a set of data into a plurality of subsets of the data, encoding the subsets of the data based on erasure coding, storing each encoded subset of the data on a different removable media units of three or more removable media units, and enabling the set of data to be recovered from two or more of the removable media units when the failure occurs in association with at least one of the other removable media units.

In one implementation, a method includes separating a set of data into a plurality of subsets of the data and encoding the subsets of the data based on erasure coding. The method also includes storing each encoded subset of the data on a different removable media unit of three or more removable media units. The method also includes enabling the set of data to be recovered from two or more of the removable media units if a failure occurs in association with at least one of the other removable media units.

With further regard to the system, in some implementations, each removable media unit is an optical disc. In some implementations, the removable media units are disaggregated. In some implementations, one or more removable media units of the plurality of removable media units are stored in one or more storage trays.

In some implementations, a system includes one or more processors, and includes logic encoded in one or more tangible media for execution by the one or more processors. When executed, the logic is operable to perform operations including causing one or more robots to transfer one or more removable media units between one or more of storage libraries and one or more head units, where the head units are operable to read and write to the one or more removable media units. The logic when executed is further operable to perform operations including enabling one or more of the robots to recover a set of data from two or more of the removable media units if a failure occurs in association with at least one of the other removable media units.

A further understanding of the nature and the advantages of particular embodiments disclosed herein may be realized by reference of the remaining portions of the specification and the attached drawings.

DETAILED DESCRIPTION

Implementations generally relate to storage systems. In one implementation, a system includes storage libraries that store removable media units. The system also includes head units for reading and writing to one or more of the removable media units. In various implementations, the removable media units are optical discs. The system also includes robots that transfer removable media units between the storage libraries and the head units. In various implementations, the removable media units are disaggregated. Also, in various implementations, the storage libraries, the removable media units, the head units, and the robots are disaggregated. The system also enables one or more of the robots to recover a set of data from two or more of the removable media units if a failure occurs in association with at least one of the other removable media units.

As described in more detail herein, data is protected and continued data access is ensured against various single as well as multiple points of failure. Such failures may be associated with a removable media unit failure, a storage library being offline, a robot being offline, and/or a head unit being offline, etc. Implementations described herein enable recovery from failure at different points failure.

Figure 1:
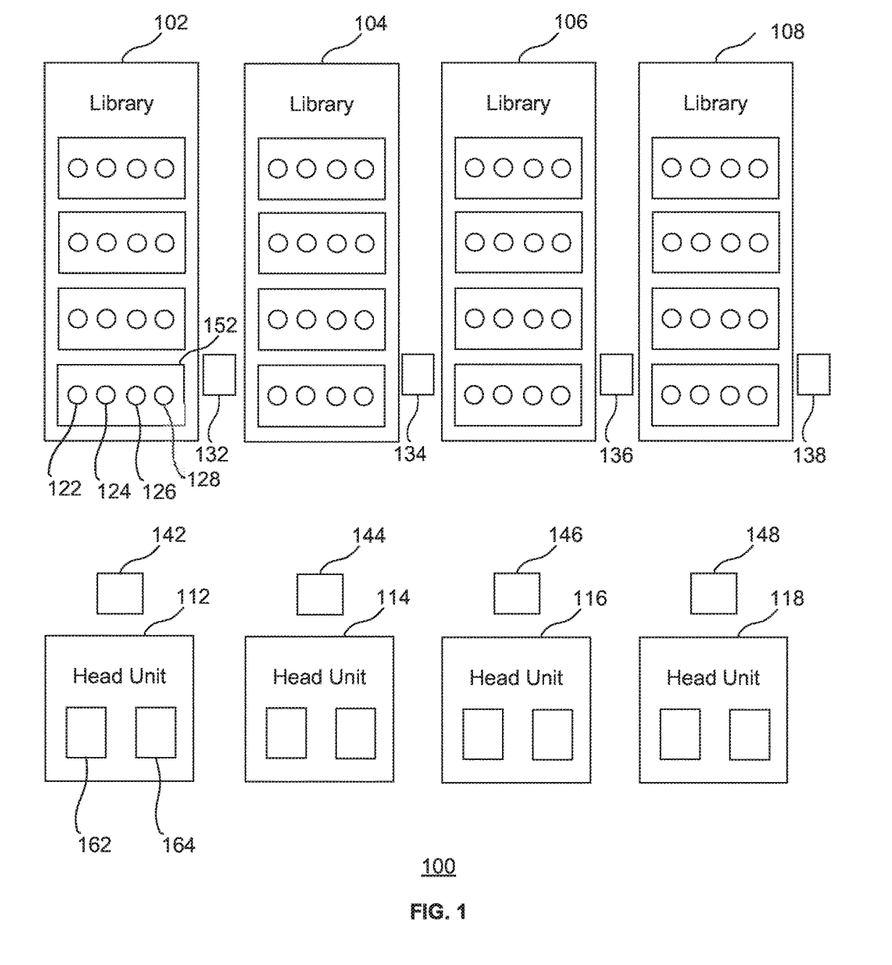
FIG. 1 illustrates a block diagram of an example storage library system, according to some implementations.

FIG. 1 illustrates a block diagram of an example storage library system 100, according to some implementations. As shown, storage library system 100, or system 100, includes one or more storage libraries 102, 104, 106, and 108, one or more head units 112, 114, 116, and 118, one or more removable media units 122, 124, 126, and 128, and one or more robots 132, 134, 136, 138, 142, 144, 146, and 148.

For ease of illustration, FIG. 1 shows four storage libraries 102, 104, 106, and 108, four head units 112, 114, 116, and 118, and eight robots 132, 134, 136, 138, 142, 144, 146, and 148. There may be any number of storage libraries, head units, and robots, depending on the particular implementation.

In various implementations, storage libraries 102, 104, 106, and 108 store removable media units. In various implementations, each removable media unit is an optical disc. While example implementations are described herein in the context of optical discs or platters, other types of removable media units are possible. For example, in some implementations, one or more removable media units may be magnetic media units such as magnetic tape media units.

In various implementations, head units 112, 114, 116, and 118 read and write to one or more of the removable media units. More specifically, each head unit includes one or more drives for reading one of the removable media units, and includes one or more burners for writing to one of the removable media units. For example, as shown, head unit 112 includes a drive 162 and a burner 164.

In some implementations, one or more of the removable media units may be stored in one or more storage trays. For example, storage tray 152 stores removable media units 122, 124, 126, and 128. In various implementations, the storage trays are stored in the storage libraries.

For ease of illustration, FIG. 1 shows four storage trays for each storage library. The number of storage trays stored at each storage library may vary and will depend on the particular implementation. For example, the size and capacity of each storage library may vary. Also, in various implementations, each storage library may have multiple racks or shelves in order to store columns or stacks of storage trays on different shelves. As shown, each shelf may store a row of storage trays. A given storage library may store many storage trays (e.g., thousands of storage trays, etc.), and thus may store hundreds of thousands of removable media units.

In various implementations, the storage libraries, the removable media units, the head units, and the robots of storage library system 100 are disaggregated. The storage libraries, the removable media units, the head units, and the robots are disaggregated in that they are separable from each other and not coupled to each other. For example, in some implementations, the one or more of the storage libraries may be located in the same building as one or more of the head units. For example, storage library 102 and head unit 112 may be located in the same building. In some implementations, storage libraries 102, 104, 106, and 108, and head units 112, 114, 116, and 118 may be locate in the same building.

In some implementations, the one or more of the storage libraries may be located in different buildings from one or more of the head units. For example, storage library 102 may be located in a different building from head unit 112. In some implementations, storage libraries 102, 104, 106, and 108, and head units 112, 114, 116, and 118 may all be located in different buildings.

Some storage libraries may be located in the same buildings while other storage libraries are located in different buildings. Similarly, some head units may be located in the same buildings while other head units are located in different buildings.

Any combination of these storage libraries and head units may be grouped together in the same building, depending on the particular implementation. For example, storage libraries 102 and 104 and head units 112 and 114 may be located in one building, while storage libraries 106 and 108 and head units 116 and 118 may be located in another building. In another example configuration, storage libraries 102, 104, 106, and 108 may be located in one building, while head units 112, 114, 116 and 118 are located in another building.

In various implementations, each of robots 132, 134, 136, 138, 142, 144, 146, and 148 may be located adjacent to their respective storage library or respective head unit, as shown. For example, robot 132 may be located adjacent to storage library 102, and robot 142 may be located adjacent to head unit 112. In various implementations, these would be default positions or initial positions when the robots are on standby. These robots leave their initial positions when called to transport storage trays or removable media units. The transfer of removable media units is described in more detail herein.

In various implementations, one or more of the robots may function as automated guided vehicles (AGVs). For example, robots 132, 134, 136, and 138 may also be referred to AGV robots 132, 134, 136, and 138. As described in more detail herein, each of the AGV robots 132, 134, 136, and 138 is operable to traverse among shelves of one or more libraries in order to retrieve storage trays, and to transport removable media units in those storage trays to one or more head units, and vice versa.

Robots 142, 144, 146, and 148 may also be referred to as head unit robots 142, 144, 146, and 148. As described in more detail herein, head unit robots 142, 144, 146, and 148 transfer removable media units between storage trays and head units.

Because the storage libraries, the removable media units, the head units, and the robots of storage library system 100 are disaggregated, if any one or more of these elements fails, the remaining elements continue to operate independently. This enables data recovery and continuous data access if a failure occurs in association with any of these elements. Various implementations involving data recovery are described in more detail herein.

Figure 2:
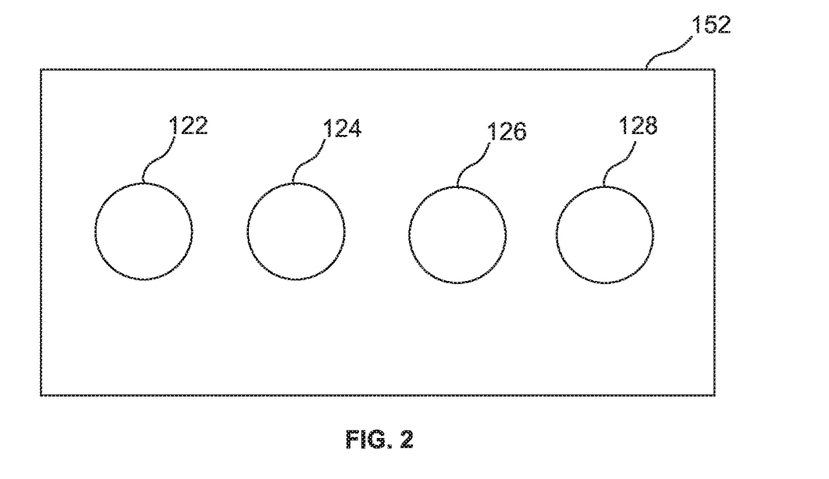
FIG. 2 illustrates a top view diagram of an example storage tray, according to some implementations.

FIG. 2 illustrates a top view diagram of an example storage tray 152, according to some implementations. The relative size of storage tray 152 relative to removable media units 122, 124, 126, and 128, will depend on the particular implementation.

Figure 3:
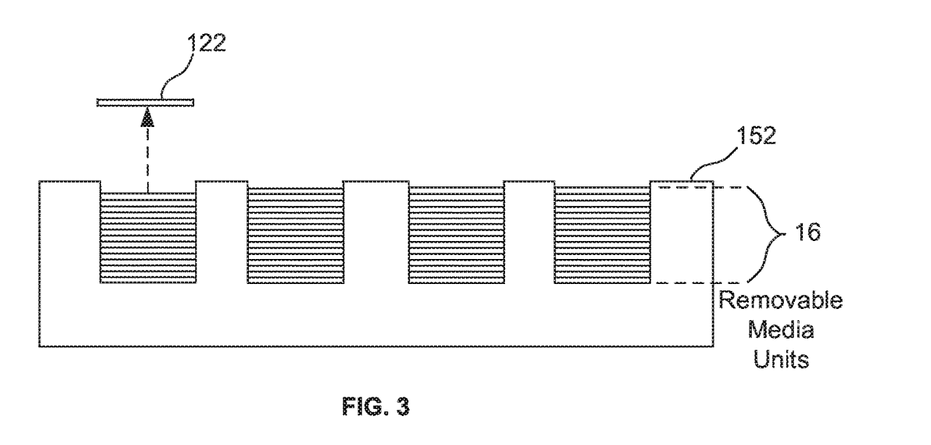
FIG. 3 illustrates a cross-sectional view diagram of an example storage tray, according to some implementations.

FIG. 3 illustrates a cross-sectional view diagram of an example storage tray, according to some implementations. As shown, storage tray 152 contains receptacles or wells that are configured to receive one or more removable media units 122, 124, 126, and 128. In some implementations, each well is deep enough to receive 16 stacked removable media units (indicated by the bracket in FIG. 3). While 16 removable media units are shown in each well in this particular implementation, the exact number of removable media units in each well may vary and will depend on the particular implementation.

In various implementations, the removable media units are disaggregated. For example, removable media units are disaggregated in that they are separable from each other (not coupled to each other). As shown, removable media units are accessed from the top of each stack. For example, removable media unit 122 is shown being lifted upward from its well (indicated by a dotted arrow in FIG. 3).

Figure 4:
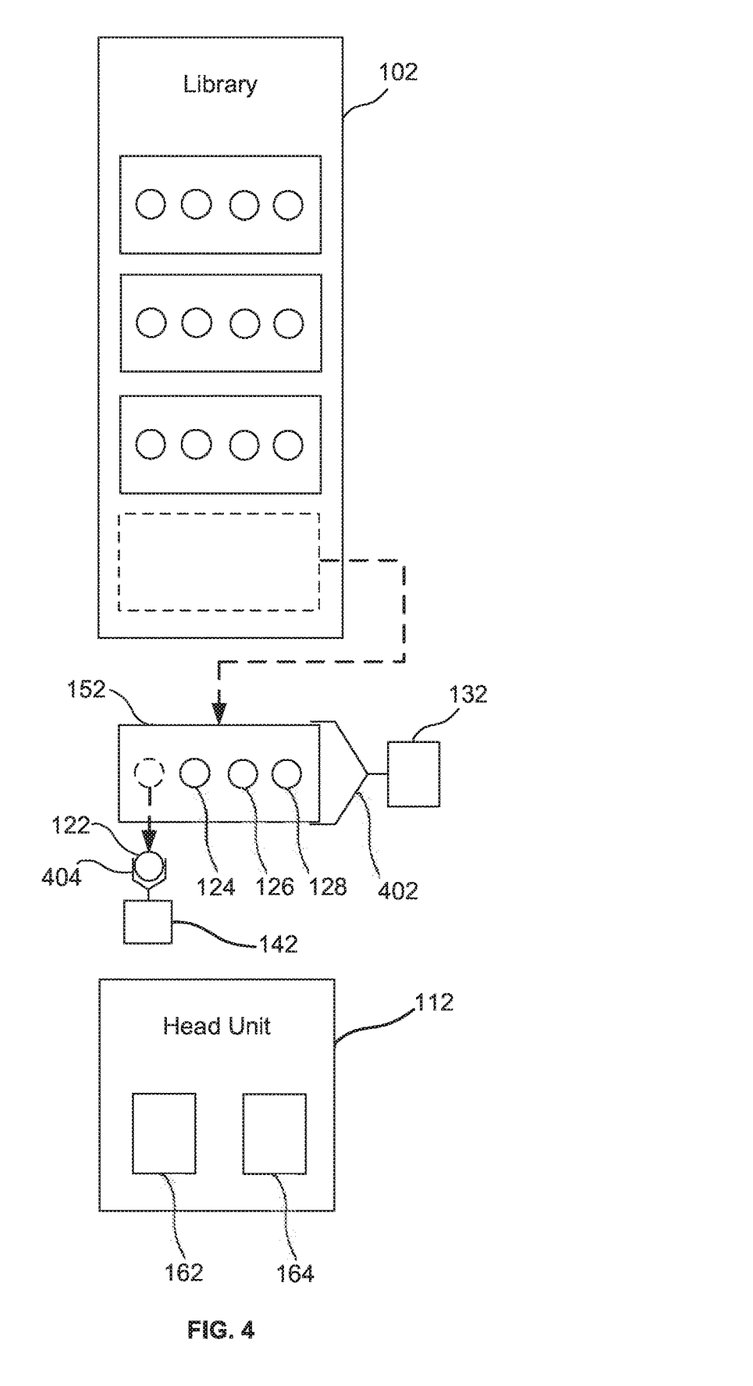
FIG. 4 illustrates a block diagram of an example storage library system, according to some implementations.

FIG. 4 illustrates a block diagram of an example storage library system, according to some implementations. The particular example implementation, elements shown in FIG. 4 correspond to some of the elements shown in FIG. 1.

In various implementations, one or more robots transfer one or more of the removable media units between one or more of the storage libraries and one or more of the head units. For example, referring to FIG. 4, robot 132 is shown transferring removable media units 122, 124, 126, and 128 (contained in storage tray 152) between storage library 102 and head unit 112.

As shown, robot 132 grabs storage tray 152 using a grabbing mechanism 402 or any other suitable means. Robot 132 pulls storage tray 152 from its stored position (indicated by the dotted rectangle in FIG. 4) and carries storage tray 152 away from storage library 102 and to head unit 112 (indicated by the dotted arrow in FIG. 4).

In various implementations, the one or more robots may transfer one or more removable media units in a storage tray from at least one of the storage libraries to the one or more head units. For example, when storage tray 152 arrives at head unit 112, robot 142 removes or extracts a removable media unit (e.g., removable media unit 122) from storage tray 152 (indicated by the dotted arrow in FIG. 4). As shown, robot 142 extracts removable media unit 122 using grabbing mechanism 404 or any other suitable means. Robot 142 then inserts removable media unit such 122 into head unit 112 for processing. For example, drive 162 of head unit 112 may read the data from removable media unit 122. Also, burner 164 of head unit 112 may write data to removable media unit 122.

Robot 142 may perform similar actions with other removable media units such as removable media units 124, 126, and 128. When a given removable media unit such as removable media unit 122 is finished being processed, robot 142 may return the removable media unit from head unit 112 back to storage tray 152. When all intended removable media units associated with storage tray 152 have been processed and returned to storage tray 152, and robot 132 returns storage tray to storage library 102.

In some implementations, grabbing mechanism 404 of robot 142 may grab an entire stack of removable media unit. As such, if head unit 112 has multiple drivers or burners, robot 142 may load multiple removable media units to multiple drivers and/or burners quickly in serial or in parallel/simultaneously.

As described in more detail herein, in various implementations, system 100 separates a set of data into a plurality of subsets of the data, and encodes the subsets of the data based on erasure coding. System 100 then stores each encoded subset of the data on a different removable media units of three or more removable media units. In various implementations, system 100 then enables the set of data to be recovered from two or more of the removable media units when the failure occurs in association with at least one of the other removable media units. For example, system 100 enables one or more of the robots to recover a set of data from two or more of the removable media units if a failure occurs in association with at least one of the other removable media units. Various implementations associated with data recovery are described in more detail herein.

Figure 5:
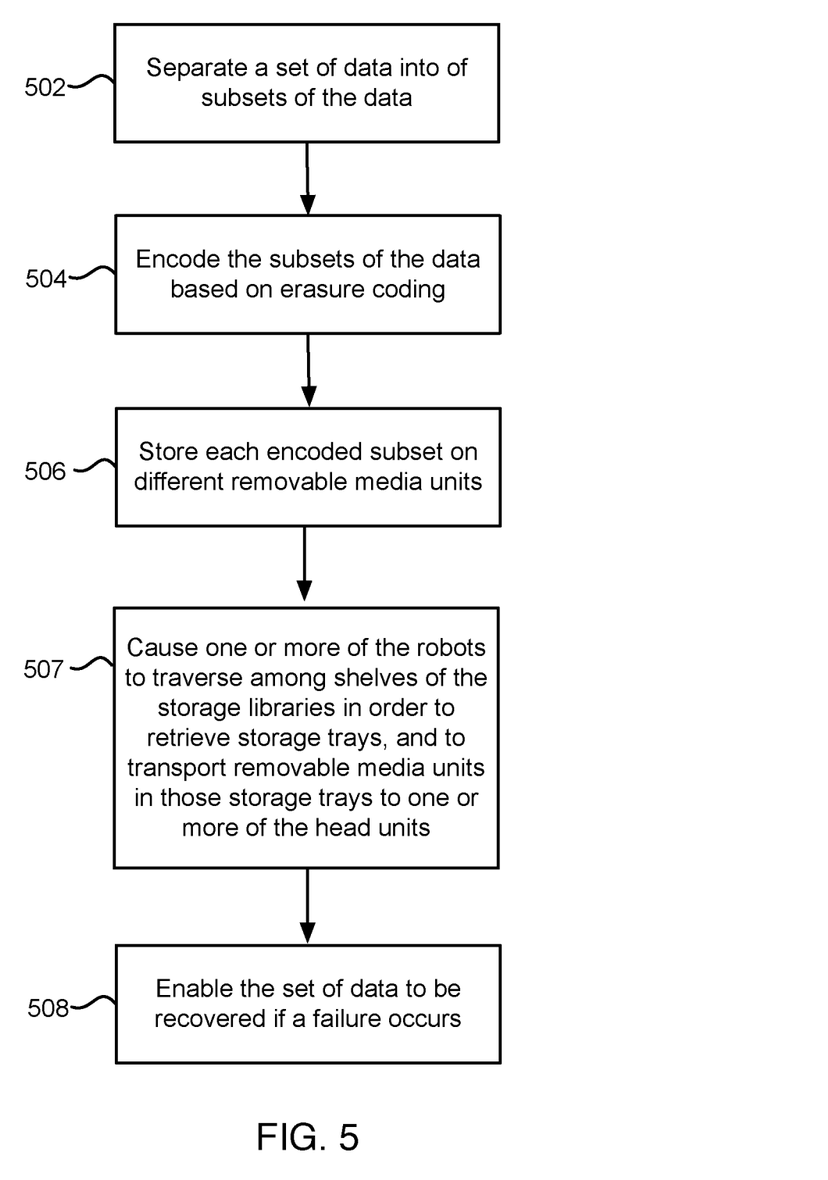
FIG. 5 illustrates a flow diagram for providing a storage library system, according to some implementations.

FIG. 5 illustrates a flow diagram for providing a storage library system, according to some implementations. Referring to both FIGS. 1 and 5, in various implementations, a method is initiated at block 502, where system 100 separates or chards a set of data into a plurality of subsets of the data.

At block 504, system 100 encodes the subsets of the data based on erasure coding. In various implementations, the data subsets are encoded with a configurable number of redundant pieces of data. In some implementations, the erasure coding may be based on an erasure code forward error correction scheme. In various implementations, to perform the encoding, system 100 may generate a predefined mathematical function that describes a set of numbers that can be checked for accuracy and recovered if one or more numbers are lost. In some implementations, the mathematical function may involve oversampling and/or polynomial interpolation based on Reed-Solomon codes.

In some implementations, a ratio of failing to good data subsets (wherever they may be stored) may be defined. For example, the encoding of the data subsets may be based on allowing two of eight failures associated with different data subsets. Each data subset may be stored in different removable media units and/or in different storage libraries, etc.

At block 506, system 100 stores each encoded subset of the data on a different removable media unit of three or more removable media units. In various implementations, the encoded subsets of data are stored across different locations, which may include different geographical locations.

In various implementations, the encoded subsets of data may be stored across different removable media units in the same storage tray. In some implementations, the encoded subsets of data may be stored across different removable media units in different storage trays, where such storage trays may be distributed and stored in the same storage library or stored in different storage libraries.

As such, if a given removable media unit fails, all of the subsets of data may be recovered from other removable media units whether those other removable media units are stored in the same tray, different trays in the same storage library, and/or different trays in different storage libraries. In various implementations, the erasure coding is configurable based on a predetermined redundancy level.

At block 507, system 100 causes one or more of robots to traverse among shelves of one or more storage libraries in order to retrieve storage trays, and to transport removable media units in those storage trays to one or more head units.

At block 508, system 100 enables the set of data to be recovered from two or more of the removable media units if a failure occurs in association with at least one of the other removable media units. In various implementations described herein protect continued data access against various single points of failure, such as a removable media unit failure, a storage library being offline, a robot being offline, and/or a head unit being offline, etc. In other words, if any one or more of these elements fail or are otherwise completely offline, system 100 still has access to all the data. As a result, implementations described herein provide multiple levels of redundancy. Example implementations are described in more detail herein.

For example, in some implementations, if the failure occurs at a failed removable media unit (and/or any other failed removable media unit), system 100 enables at least one of the robots to bypass the one or more failed removable media units and to recover the set of data from two or more other non-failing removable media units.

In some implementations, the encoded subsets of data may be stored across different removable media units in the same tray. As described in more detail herein, if a given removable media unit fails, all of the subsets may be recovered from the other removable media units in the same tray.

In some implementations, the encoded subsets of data may be stored across different removable media units. In some implementations, system 100 stores the subsets of data across four removable media units. As such, if one removable media unit fails, system 100 may recover the data from the other three removable media units. The particular number of removable media unit across which the subsets of data are stored will depend on the particular implementations. For example, the data subsets may be stored across three removable media units, or even five removable media units, etc.

In some implementations, if the failure occurs at a failed storage library (and/or any other failed storage library), system 100 enables at least one of the robots to bypass the one or more failed storage libraries in order to access one or more of the removable media units stored at another non-failing storage library. In some implementations, the encoded subsets of data may be stored across different removable media units in different storage trays, where such storage trays may be distributed and stored in the same storage library or stored in different storage libraries. In other words, erasure coding for a given set of data may occur within one storage library or across multiple storage libraries.

In some implementations, the encoded subsets of data may be stored across different storage libraries. In some implementations, system 100 stores the subsets of data across removable media units in four different storage libraries. As such, if one storage library goes offline, system 100 may recover the data from the other three removable media units stored at the other storage libraries. The particular number of storage libraries across in which the subsets of data are stored will depend on the particular implementations. For example, the data subsets may be stored across three removable media units in three different storage libraries. As such, each of the three removable media units is stored in a different storage library. In another example, the data subsets may be stored across five removable media units in five different storage libraries. As such, each of the five removable media units is stored in a different storage library.

In some implementations, if the failure occurs at a failed robot (and/or any other failed robot) associated with a particular storage library (e.g., an AGV robot), system 100 enables at least one other robot (e.g., an AGV robot) to bypass the one or more failed robots in order to access one or more of the removable media units stored at the particular storage library. For example, if robot 132 goes offline, system 100 may cause robot 134 or any other available robot to substitute for robot 132, and vice versa.

In some implementations, if the failure occurs at a failed robot (and/or any other failed robot) associated with a particular head unit (e.g., a head unit robot), system 100 enables at least one other robot (e.g., a head unit robot) to bypass the one or more failed robots in order to transfer one or more of the removable media units to and from the particular head unit. For example, if robot 142 goes offline, system 100 may cause robot 144 or any other available robot to substitute for robot 142, and vice versa. In some scenarios, if a given head unit robot associated with a head unit is stationary, and if that head unit robot goes offline, system 100 may also utilize an alternative head unit that has a head unit robot that is available. This may be the case if, for example, a head unit robot such as robot 142 is fixed to or is integrated with its corresponding head unit such as head unit 112.

In some implementations, if the failure occurs at a failed head unit (and/or any other failed head unit), system 100 enables at least one of the robots to bypass the one or more failed head units in order to transfer one or more of the removable media units to and from another head unit.

As a result, the data is protected and continued data access is ensured against various single points of failure, whether the failure is associated with a media unit failure, a storage library being offline, a robot being offline, and/or a head unit being offline, etc. In various scenarios, failures may occur concurrently at multiple locations (e.g., removable media unit, storage library, robot, head unit, etc.). Implementations described herein enable recovery from failure at different points failure.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 6:
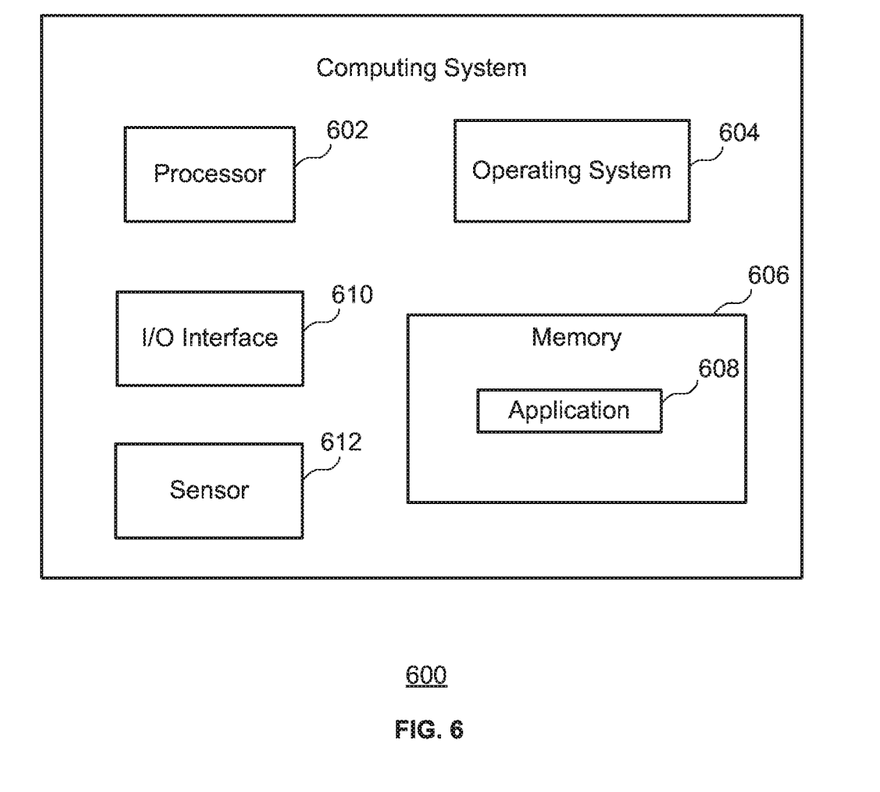
FIG. 6 illustrates a block diagram of an example computing system, which may be used for some implementations described herein.

FIG. 6 illustrates a block diagram of an example computing system 600, which may be used for some implementations described herein. For example, computing system 600 may be used to implement system 100, as well as to perform the method implementations described herein. For example, in various implementations, system 600 may include one or more processors, and include logic encoded in one or more tangible media for execution by the one or more processors. When executed, the logic is operable to perform operations including causing one or more robots to transfer one or more removable media units between one or more of storage libraries and one or more head units, as described herein. In various implementations, the head units are operable to read and write to the one or more removable media units. The logic is also operable to perform operations including enabling one or more of the robots to recover a set of data from two or more of the removable media units if a failure occurs in association with at least one of the other removable media units. Various implementations of which are described in more detail herein.

In some implementations, computing system 600 may include a processor 602, an operating system 604, a memory 606, a software application 608, and an input/output (I/O) interface 610, and location sensing unit or sensor 612. In various implementations, processor 602 may be used to implement various functions and features described herein, as well as to perform the method implementations described herein. While processor 602 is described as performing implementations described herein, any suitable component or combination of components of computing system 600 or any suitable processor or processors associated with computing system 600 or any suitable system may perform the steps described. Implementations described herein may be carried out on a user device, on a server, or a combination of both.

In various implementations, computing system 600 may represent a central server that coordinates and directs robots to transfer removable media units among the storage libraries and head units. In various implementations, sensor 612 may represent a location sensing unit or positioning system at the server that locates objects such as robots, storage libraries, removable media units, unit heads, etc.

In some implementations, computing system 600 may represent a computing system on each of the robots for performing implementations described herein. In various implementations, sensor 612 may represent a location sensing unit or positioning system at a robot that locates other objects such other robots, storage libraries, removable media units, unit heads, etc.

In various implementations, software application 608 may be stored on memory 606 or on any other suitable storage location or computer-readable medium. Software application 608 provides instructions that enable processor 602 to perform the functions described herein and other functions. The components of computing system 600 may be implemented by one or more processors or any combination of hardware devices, as well as any combination of hardware, software, firmware, etc.

For ease of illustration, FIG. 6 shows one block for each of processor 602, operating system 604, memory 606, software application 608, I/O interface 610, and sensor 612. These blocks 602, 604, 606, 608, 610, and 612 may represent multiple processors, operating systems, memories, software applications, I/O interfaces, and sensors. In various implementations, computing system 600 may not have all of the components shown and/or may have other elements including other types of components instead of, or in addition to, those shown herein.

Although the description has been described with respect to particular embodiments thereof, these particular embodiments are merely illustrative, and not restrictive. Concepts illustrated in the examples may be applied to other examples and implementations.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A system comprising:
a plurality of storage libraries that store a plurality of removable media units;
a plurality of head units for reading and writing to one or more of the removable media units; and
a plurality of robots that transfer one or more of the removable media units between one or more of the storage libraries and one or more of the head units, wherein the plurality of storage libraries, the plurality of removable media units, the plurality of head units, and the plurality of robots are disaggregated in that they are separable from each other and not coupled to each other, wherein one or more of the robots traverse among shelves of the storage libraries in order to retrieve storage trays, and transport removable media units in those storage trays to one or more of the head units, wherein one or more of the robots are enabled to recover a set of data from two or more of the removable media units if a failure occurs in association with at least one of the other removable media units, wherein the set of data is separate into a plurality of subsets of the data, wherein the subsets of the data are encoded based on erasure coding, wherein each encoded subset of the data is stored on a different removable media unit of three or more removable media units, wherein the removable media units are disaggregated in that they are separable from each other and not coupled to each other, and wherein the encoded subsets of data are stored across different locations.

2. The system of claim 1, wherein one or more of the storage libraries are located in different buildings from one or more of the head units.

3. The system of claim 1, wherein if the failure occurs at at least one failed removable media unit of the plurality of removable media units, the system enables least one of the robots to bypass the at least one failed removable media unit and to recover the set of data from two or more other removable media units.

4. The system of claim 1, wherein if the failure occurs at at least one failed robot associated with a particular storage library, the system enables at least one other robot to bypass the at least one failed robot in order to access one or more of the removable media units stored at the particular storage library.

5. The system of claim 1, wherein if the failure occurs at at least one failed robot associated with a particular head unit, the system enables at least one other robot to bypass the at least one failed robot in order to transfer one or more of the removable media units to and from the particular head unit.

6. The system of claim 1, wherein if the failure occurs at at least one failed storage library, the system enables at least one of the robots to bypass the at least one failed storage library in order to access one or more of the removable media units stored at another storage library.

7. The system of claim 1, wherein if the failure occurs at at least one failed head unit, the system enables at least one of the robots to bypass the at least one failed head unit in order to transfer one or more of the removable media units to and from another head unit.

8. The system of claim 1, wherein each removable media unit is optical disc.

9. The system of claim 1, wherein one or more of the removable media units are stored in one or more storage trays.

10. The system of claim 1, wherein the one or more robots transfer the one or more removable media units in a storage tray from at least one of the storage libraries to the one or more of the head units.

11. The system of claim 1, wherein each head unit comprises one or more drives for reading one of the removable media units.

12. The system of claim 1, wherein each head unit comprises one or more burners for writing to one of the removable media units.

13. The system of claim 1, wherein the system performs operations comprising:
separating a set of data into a plurality of subsets of the data;
encoding the subsets of the data based on erasure coding;
storing each encoded subset of the data on a different removable media units of three or more removable media units; and
enabling the set of data to be recovered from two or more of the removable media units when the failure occurs in association with at least one of the other removable media units.

14. A method comprising:
separating a set of data into a plurality of subsets of the data;
encoding the subsets of the data based on erasure coding;
storing each encoded subset of the data on a different removable media unit of three or more removable media units, wherein the removable media units are disaggregated in that they are separable from each other and not coupled to each other, and wherein the encoded subsets of data are stored across different locations;
causing one or more robots to traverse among shelves of one or more storage libraries in order to retrieve storage trays, and to transport removable media units in the storage trays to one or more head units; and
enabling the set of data to be recovered from two or more of the removable media units if a failure occurs in association with at least one of the other removable media units.

15. The method of claim 14, wherein each removable media unit is an optical disc.

16. The method of claim 14, wherein one or more of the removable media units are stored in one or more storage trays.

17. A system comprising:
one or more processors; and
logic encoded in one or more tangible media for execution by the one or more processors and when executed operable to perform operations comprising:
separating a set of data into a plurality of subsets of the data;
encoding the subsets of the data based on erasure coding;
storing each encoded subset of the data on a different removable media unit of three or more removable media units, wherein the removable media units are disaggregated in that they are separable from each other and not coupled to each other, and wherein the encoded subsets of data are stored across different locations;
causing one or more robots to traverse among shelves of one or more storage libraries in order to retrieve storage trays, and to transport removable media units in the storage trays to one or more head units, wherein the one or more head units are operable to read and write to one or more of the removable media units; and
enabling one or more of the robots to recover a set of data from two or more of the removable media units if a failure occurs in association with at least one of the other removable media units, wherein the one or more storage libraries, the one or more removable media units, the one or more head units, and the one or more robots are disaggregated in that they are separable from each other and not coupled to each other.

* * * * *